(12) United States Patent
Parsa (10) Patent No.: US 7,252,810 B2
(45) Date of Patent: Aug. 7, 2007

(54) MULTI-SECTIONAL SYSTEM FOR CONTINUOUS GAS SEPARATION

(75) Inventor: Komad Parsa, Laguna Niguel, CA (US)

(73) Assignee: Parsa Investments, L.P., Laguna Niguel, CA (US)

( * ) Notice: Subject to any disclaimer, the term of this patent is extended or adjusted under 35 U.S.C. 154(b) by 552 days.

(21) Appl. No.: 10/680,603

(22) Filed: Oct. 6, 2003

(65) Prior Publication Data

US 2004/0065594 A1    Apr. 8, 2004

Related U.S. Application Data

(63) Continuation-in-part of application No. 10/402,279, filed on Mar. 27, 2003, which is a continuation of application No. 10/194,628, filed on Jul. 12, 2002, now Pat. No. 6,585,809.

(51) Int. Cl.
*B01J 19/08* (2006.01)

(52) U.S. Cl. ............... 422/186.04; 96/66; 96/70

(58) Field of Classification Search ........... 422/186.04; 96/66, 70
See application file for complete search history.

(56) References Cited

U.S. PATENT DOCUMENTS

| | | |
|---|---|---|
| 3,154,682 A | 10/1964 | Hartz et al. |
| 3,792,690 A | 2/1974 | Cooper |
| 4,066,526 A | 1/1978 | Yeh |
| 4,313,739 A | 2/1982 | Douglas-Hamilton |
| 4,919,690 A | 4/1990 | Lovelock |
| 5,024,685 A | 6/1991 | Torok et al. |
| 5,591,253 A | 1/1997 | Altman et al. |
| 6,110,242 A * | 8/2000 | Young .................... 55/337 |
| 6,773,489 B2 * | 8/2004 | Dunn ..................... 95/78 |
| 6,895,945 B2 * | 5/2005 | Parsa .................... 123/539 |
| 2005/0178270 A1 * | 8/2005 | Ito et al. ................ 96/18 |

FOREIGN PATENT DOCUMENTS

| | | |
|---|---|---|
| EP | 0983786 | 3/2000 |
| JP | 63-158114 A * | 7/1988 |

(Continued)

OTHER PUBLICATIONS

EPO Patent Abstracts of Japan Publ. No. 2001070743, Mar. 21, 2001 (Norikazu).

(Continued)

*Primary Examiner*—Kishor Mayekar
(74) *Attorney, Agent, or Firm*—O'Melveny & Myers LLP (57) ABSTRACT

A system for separating a gaseous constituent from a gaseous mixture includes a substantially sealed passageway extending between a first exhaust port and a second exhaust port. An entry port for a gas mixture to be separated opens into the passageway. At least three gas-permeable electrodes are disposed across the passageway at intervals. The electrodes divide the passageway into multiple sections. Each section is bounded at opposing ends by an electrode, and the sections are disposed in serial fashion through at least a portion of the passageway. A high-voltage static electric field may be applied to opposing electrodes of one or more sections. When voltage is so applied, gas may be drawn through a static electric field in one or more sections, by applying suction to the exhaust ports.

14 Claims, 3 Drawing Sheets

FOREIGN PATENT DOCUMENTS

JP     WO 03/082443     10/2003

OTHER PUBLICATIONS

EPO Patent Abstracts of Japan Publ. No. 63242320, Oct. 7, 1988 (Takeshi).

EPO Patent Abstracts of Japan Publ. No. 63049225, Mar. 2, 1988 (Hajime).

DATABASE EPOC 'Online! European Patent Office, NL; XP002255021 abstract, Publ. No. CN 1066404A, Nov. 25, 1992 (Li).

\* cited by examiner

MULTI-SECTIONAL SYSTEM FOR CONTINUOUS GAS SEPARATION

RELATED APPLICATION

This application is a continuation-in-part of application Ser. No. 10/402,279, filed Mar. 27, 2003, which is a continuation of Ser. No. 10/194,628, filed Jul. 12, 2002, now U.S. Pat. No. 6,585,809.

BACKGROUND OF THE INVENTION

1. Field of the Invention

The present invention relates to a method and system for separation of gas mixtures into gas volumes having higher concentrations of selected constituent gases, and particularly to such methods and systems as operate at relatively low pressures, such as partial atmospheric pressure, or less.

2. Description of Related Art

It is generally desirable, for a variety of applications, to separate constituent gases of a gaseous mixture. For example, the constituent gases of oxygen, nitrogen, carbon dioxide, argon, etc., are often separated from air, using numerous different methods. Methods for such separation often entail the use of massive and/or complex equipment, and consume a large amount of energy. Consequently, bottled gas (pressurized or liquefied) is predominantly used for applications in which a relatively pure gas is required. Except for a few specialized industrial processes, continuous, on-demand gas separation methods that use ambient air as a feedstock are generally too expensive and/or not technically feasible for many applications in which gaseous separation may be beneficial.

For example, for combustion engine applications, it may be beneficial to enrich intake air with oxygen, to enable increased power or efficiency. Presently, there is no effective solution for providing oxygen in a continuous process using air as a feedstock, that is feasible for use with gasoline or diesel engines in transportation applications. Similar benefits might be realized with other mobile or stationary power plants or combustion applications. Separation of more concentrated oxygen and/or nitrogen streams from ambient air may also be useful for various different industrial processes, for fire prevention or suppression, for air conditioning or medical purposes, and/or other applications.

Separation of electronegative and electropositive gases using a static electric field and permeable electrodes is known in the art. Despite this knowledge, there are few, if any, examples where such systems have found practical application. In short, the prior art has failed to produce a practical system with proven effectiveness for separating gaseous constituents in an open, continuous process system. In particular, the prior art has failed to provide a system of proven effectiveness for separating oxygen from air.

It is desirable, therefore, to provide a more effective system and method for separating, at least in part, constituents of a gaseous mixture. The system and method should be capable of separating the primary constituents of ambient air (i.e., oxygen and nitrogen) using relatively light-weight equipment that is economical and relatively maintenance-free. The equipment should be useful for diverse applications, for example, for use with diesel or gasoline engines in trucking, marine, or automotive applications, or for any other application where a continuous gas stream that is at least partially enriched in oxygen or nitrogen is desired.

SUMMARY OF THE INVENTION

The invention provides a method and system for separating constituents of gas mixtures, that is suitable for separating oxygen, nitrogen, and perhaps other constituents, from ambient air in a continuous process. The method may be implemented using lightweight, relatively inexpensive equipment that may be configured for a variety of different applications and operating environments. The invention is therefore believed suitable for use with a variety of different applications for which continuous, on-demand gas separation was previously not feasible.

In an embodiment of the invention, a system for separating a gaseous constituent from a gaseous mixture includes a substantially sealed passageway extending between a first exhaust port and a second exhaust port. An entry port for a gas mixture to be separated opens into the passageway, between the first exhaust port and the second exhaust port. At least three gas-permeable electrodes are disposed across the passageway at intervals. The electrodes divide the passageway into multiple sections. Each section is bounded at opposing ends by an electrode, and the sections are disposed in serial fashion through at least a portion of the passageway. A high-voltage static electric field may be applied to opposing electrodes of one or more sections. When voltage is so applied, gas may be drawn through a static electric field in one or more sections, by applying suction to the exhaust ports.

Adjacent sections of the passageway may be bounded by electrodes of the same polarity, or of opposite polarity. At least one section, however, is bounded by electrodes of opposite polarity. A static electric field in adjacent sections is maintained in a uniform direction through the passageway, by appropriately maintaining the polarity of each section.

According to a method of the invention, a gas mixture is continuously introduced into one of the sections with oppositely-charged electrodes, which acts as an ionization chamber. The electrodes may be generally planar or sheet-like, with a primary surface of relatively large area and many small openings to allow the passage of gas. In the alternative, the electrodes may be configured as wire or needle arrays, or as contoured sheets with many small openings. Each electrode has a second surface facing either an exhaust plenum, or an adjacent section of a gas flow passageway. The ionization chamber and the two exhaust plenums are also bounded by walls of the passageway. If the passageway walls surfaces are conductive, they are insulated from the electrodes.

Each exhaust plenum is connected to an exhaust port through which an exhaust gas stream is drawn at a controlled rate. The gas mixture in the passageway is maintained at a controlled pressure that is generally less than atmospheric pressure, for example, a low vacuum pressure. In an embodiment of the invention, gas pressure is maintained by adjusting a gas input valve connected to the volume between the electrodes, depending on the exhaust rate. By throttling the input valve while pumping gas out the exhaust port, a continuous flow of low-pressure gas can be drawn through the volume between the electrodes and out the separate exhaust ports. In the alternative, the entry port for the passageway may be maintained in a fixed state, and flow through the device may be controlled via the exhaust ports. For example, the exhaust flow may be varied by controlling the pumping speed of an exhaust pump, and/or by using an adjustable valve in the exhaust. In addition, or in the alternative, the entry port may comprise an array of small holes or voids that permits the gas mixture to enter into the passageway under laminar flow conditions. It is believed that maintaining laminar flow conditions through the passageway, electrodes, and exhaust plenums will increase the effectiveness of the device, but may not be critical for success.

The electrodes of at least one section in the passageway are connected to opposite terminals of a static high-voltage source, thereby establishing a static electric field between the plates. Electrode voltage should be selected to promote ionization of the gas mixture in the input space, while avoiding generation of any unwanted ion species. Optimum voltage will depend on parameters such as the chemistry of the gas mixture; spacing, shape, and composition of the electrodes, and gas flow rate. In general, higher gas pressures may facilitate higher mass flow rates, while requiring higher electrode voltage. If gas pressure is too high, however, separation of different ionic species may be impaired.

The electric field between the electrodes may cause a portion of the gas to become ionized. In an embodiment of the invention, the amount of ionization is increased by exposing the gas in the input space to ionizing radiation, such as from an ultraviolet lamp or other radiation source. In another embodiment, the electrodes may by themselves provide adequate ionization, without a further radiation source.

It is believed that a high-voltage electric field may be sufficiently effective for ionizing the gas mixture under certain conditions. For example, in a system for separating oxygen and nitrogen from air at close to atmospheric pressure, it was discovered that use of an ultraviolet lamp increased the effectiveness of the device by only a small amount. Accordingly, for some applications it may be desirable to omit a separate source of ionizing radiation, and rely entirely on the electric field between the electrodes for ionizing the gas mixture.

Separation of the gas species from the mixture proceeds as the gaseous mixture between the electrodes is ionized. In many gas mixtures, different gas species of the mixture will possess a greater affinity for electrons than other species of the mixture. Hence, when the gas mixture is ionized, the negative ions will be made up of a proportionally greater number of the gas species having a higher electron affinity, depending on factors such as the electric field strength, the type of gas, and the density of the gas. For example, in a mixture of oxygen and nitrogen, oxygen has a greater affinity for electrons, so under certain conditions, a greater proportion of the negative ions will be oxygen, relative to the proportion of oxygen in air. Conversely, more of the positive ions will be nitrogen. Creation of negative $O_2$ ions and positive $N_2$ ions may predominate when the electric field is less than required to produce an arc discharge. For example, at atmospheric pressure, less than about 20,000 Volts per cm.

The oppositely charged electrodes define opposite surfaces of at least one section of the passageway, and so the negative ions propagate towards the positive electrode, and the positive ions propagate towards the negative electrode. As the ions propagate towards their respective electrodes, they are drawn through the electrode passageways into an adjacent section by suction applied through the exhaust port, eventually reaching an exhaust plenum. In the process, the charged ions may be essentially neutralized by the oppositely charged electrode or electrodes though which they are being drawn. Adjacent sections may be used primarily for neutralization of ions, or for both ionization and neutralization. The gas in the exhaust plenum is enriched in a desired gas species relative to the mixture, and is then drawn out the exhaust port for use in the intended application.

In an embodiment of the invention, multiple electrodes may be used in a parallel arrangement, with a bank of parallel electrodes of the same charge opposing a bank of electrodes all having an opposite charge. Gas from the ionization chamber is thus drawn through a bank of charged electrodes, before being exhausted from the exhaust plenum. Some adjacent sections of the passageway will therefore be bounded by electrodes having substantially the same charge. These sections will provide little or no additional electric field for ionization or separation in the passageway, but may be used to neutralize ionized gas drawn from an earlier section. An entry port may be provided into one of the electrode sections, and the separated gas streams may be evacuated out opposing ends of the conduit.

In another embodiment, a bank of permeable electrodes may be arranged in the passageway so that each of the sections provides an electric field of the same polarity relative to the direction of gas flow in the passageway. The voltage across the electrode bank may be divided among each section, thereby producing a unidirectional, static electric field through multiple sections along the length of the passageway. An entry port may be provided into any one of the electrode sections, and the separated gas streams may be evacuated out opposing ends of the conduit.

In yet another embodiment of the invention, the sections may be arranged in parallel electrically, so that each section has oppositely charged electrodes, with electrodes of the same polarity connected in parallel. The passageway may be configured to direct the gas flow so that gas passing from an earlier section is exposed, in a subsequent section, to an electric field applied transversely to the direction of flow from the earlier section. The subsequent section may include a separate exhaust port to draw gas of an undesired type out of the passageway. Accordingly, the passageway in the subsequent section may be made smaller to accommodate the diminishing flow of purified or enriched output gas, as additional undesired gas is exhausted.

A more complete understanding of the method and system for gas separation will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
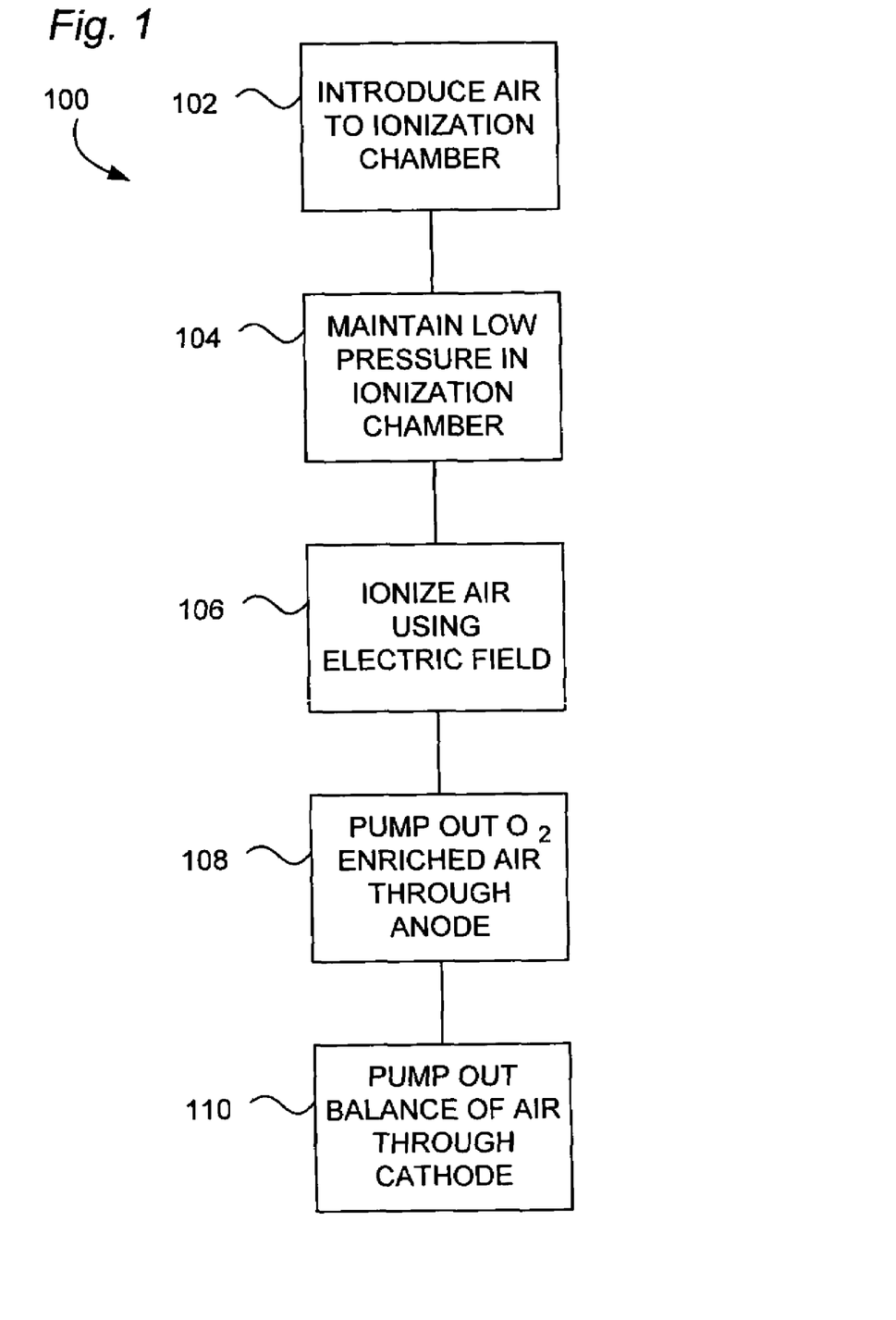
FIG. 1 is a flow diagram showing exemplary steps of a method for gas separation according to the invention.

The present invention provides a method and system for separation of a constituent from a gaseous mixture. FIG. 1 shows exemplary steps of a method 100 for separating constituents of a gaseous mixture according to the invention. Method 100 may be performed using any of the systems disclosed herein, or any other suitable equipment. Steps 102-110 are performed continuously and concurrently as a continuous method. At step 102, a gaseous mixture is introduced through an entry port into an enclosed ionization chamber. Optionally, the pressure of the mixture is reduced and regulated by a throttle valve in-line with the entry port. In the alternative, the entry port has a fixed flow capacity. An entry plenum may be used to introduce the inlet air under laminar (or less turbulent) flow conditions. The ionization chamber comprises oppositely-charged electrodes of static polarity separated by a volume for containing the gaseous mixture. One of the electrodes is a cathode and the other is an anode.

At step 104, a low pressure is maintained in the ionization chamber. "Low pressure" refers to a pressure less than atmospheric, such as between about 1-29 inches of mercury vacuum, or between about 0.05 and 0.95 atmospheres. Low pressure is maintained by controlling the exhaust flows relative to the entry port until the desired pressure is maintained in the ionization chamber. The optimal pressure will depend on the composition of the gas mixture to be separated, the electrode voltage and spacing, and perhaps on other factors.

At step 106, gas between the anode and cathode is ionized. Ionization may be driven by an electric field between the anode and cathode, by a separate radiation source, or by some combination of radiation and an electric field. Depending on system limitations and application requirements, it is generally desirable to increase the strength of the electric field to the extent possible without causing arc discharges to occur. Likewise, increasing the distance between the anode and the cathode may also aid in the separation of the ionized gases, so long as the electric field between the electrodes is sufficiently intense to promote ionization and separation. As a result of the ionization, a constituent of the gas mixture is attracted towards either the anode or the cathode. The balance of the mixture is attracted to the opposite electrode, or is unaffected by the electric field.

At step 108, gas adjacent to the anode is pumped out and discharged from the ionization chamber. This may be performed by applying suction to an exhaust plenum disposed against the anode, using any suitable pump. In an air separation process, this gas will be enriched in oxygen. Similarly, at step 110, gas adjacent to the cathode is pumped out and discharged from the ionization chamber. This gas may be deficient in oxygen, and enriched in nitrogen. Again, an exhaust plenum disposed against the cathode and suctioned by a suitable pump may be used to carry out this step. Gas pumped from the cathode is pumped in a separate gas stream segregated from gas pumped from the anode. Mass flow of gas into the ionization chamber should be equal to the sum of mass flows pumped from the anode and cathode. Under proper conditions, gas adjacent to at least one of the cathode or the anode will be enriched with respect to at least one gaseous constituent, e.g., oxygen or nitrogen when starting with air as the gaseous mixture. Hence, at least one of the exhaust streams pumped from the anode or cathode will be enriched with respect to a gaseous constituent.

In particular, method 100 may be applied for separation of oxygen from air. Experimental results showed that oxygen enrichment in the range of about 30% -40% above ambient levels may be easily achieved in the exhaust stream from the anode of the gas separator. Such results are believed useful for applications such as building air conditioning, and conditioning the intake and/or exhaust gas for internal combustion engines or other fuel-burning engines and systems. Oxygen enrichment of greater than 30% was achieved using a system similar to that described below in connection with FIG. 1. An ionization chamber pressure in the range of about 1-4 inches Hg below atmospheric pressure (between about 0.85 and 0.95 atmospheres) was found to be suitable for producing a relatively high mass flow rate of oxygen-enriched air. No separate source of ionization was needed. The electric field was about 1150 V/in, generated by electrodes of opposite polarity spaced about 4 inches apart and charged to about 5000 V prior to operation of the system's vacuum pumps. When the pumps operated, pressure between the electrodes dropped by about 4 inches Hg. The gas between the electrodes became partially ionized, as evidenced by an approximately 400 V voltage drop across the electrodes after vacuum was applied. Exhaust from the cathode end of the system was hotter than the ambient air. The increase in temperature of the cathode-end exhaust was proportional to the electric field power and voltage drop in the field induced by the vacuum pumps.

Figure 2:
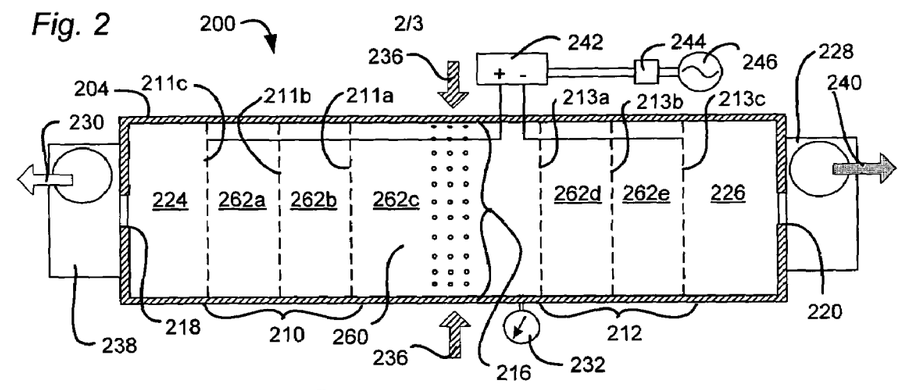
FIG. 2 is a diagram showing an exemplary multistage system for gas separation.

FIG. 2 shows a system 200 according to the invention. System 200 and its elements are shown in a simplified, diagram format. One of ordinary skill in the art will be able to select and assemble a system according to the invention from FIG. 2 and the accompanying description herein.

System 200 comprises a section 262c that serves as an ionization chamber for ionizing a gaseous mixture. The ionization chamber comprises a space between oppositely-charged, gas permeable electrodes 211a, 213a that bound opposite ends of section 262c inside of an enclosure 204. The enclosure 204 may have any suitable shape, and defines a passageway 260 between opposing exhaust ports 218, 220. The gas-permeable electrodes 211a-b and 213a-b are disposed across the passageway at intervals, thereby providing a plurality of sections 262a-f each bounded at opposing ends by an electrode. The sections are disposed in serial fashion through most of the passageway, terminating at end sections 224, 226.

FIG. 2 shows a cutaway view of a cylindrical enclosure 204 defining passageway 260. Enclosure 204 may be made of any suitable non-conductive material, for example, plastic. To save space or to fit in a particular location, the enclosure may be curved or contoured along its length. In a prototype embodiment of the invention, enclosure 204 comprised a 14-inch length of ASTM D3034, 8-inch diameter PVC pipe, with its ends sealed by metal plates.

Enclosure 204 is provided with at least three gas ports connecting with passageway 260: entry port 216, exhaust port 218, and exhaust port 220. System 200 further comprises two gas-permeable electrode banks 210, 212 (an anode bank and a cathode bank) spaced apart and insulated from one another. The electrode banks are separated from each other by the ionization chamber 262c. Each bank is comprised of a series of parallel spaced electrodes. Bank 210 is comprised of electrodes 211a-c, and bank 212 is comprised of electrodes 213a-c. The electrodes may be formed of any suitable conductive and gas-permeable material. Each electrode within a bank of electrodes may be maintained at the same voltage. For example, electrodes 211a-c may be maintained at the same positive voltage, and electrodes 213a-c may be maintained at the same negative voltage.

Figure 7:
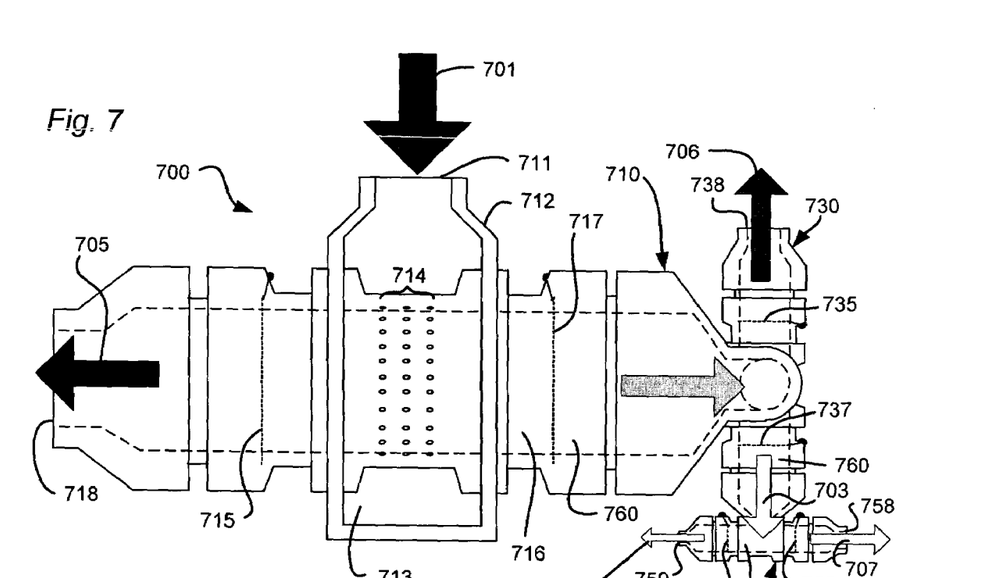
FIG. 7 shows an exemplary multistage system for gas separation, of a type utilizing a diminishing-volume sequence of ionization chambers.

Entry port 216 is configured for discharging a gaseous mixture for ionization directly into the space 262c between electrode banks 210, 212. Entry port 216 may be comprised of a plurality of small orifices that serve as an entry plenum to reduce the turbulence of air admitted into the ionization chamber 262c. In the illustrated embodiment, the entry port 216 is open to the environment, to admit ambient air. In the alternative, the entry port may be surrounded by a plenum housing (not shown) for control of the entry gas. The plenum housing may have an inlet that is connected in series with an adjustment valve (not shown). Yet another alternative is to provide a discrete entry port into the ionization chamber, with or without a series-connected entry valve. An exemplary plenum housing 712 is shown in FIG. 7. In a prototype embodiment, a single discrete entry port about 0.75 inches in diameter was used, without an adjustment valve. If present, an adjustment valve may be used to throttle gas flow into the ionization chamber, thereby providing for regulation of gas pressure in section 262c (ionization chamber). If no entry valve is provided, pressure may be controlled by controlling the speed of the exhaust pumps, or by providing an adjustment valve on one or more of the exhaust ports.

Referring again to FIG. 2, ionization may be driven entirely by an electric field that is created between electrode banks 210 and 212, by connection to a high-voltage source 242. It may be desirable to increase the strength of the electric field up to but not exceeding a level that will result in arc discharge. A higher electric field strength may result in a higher level of ionization, as well as more efficient separation of oppositely-charged ions.

Use of an ionizing radiation source (not shown) in the ionization chamber may permit lower electrode voltages to be used, all other things being equal. The ionization chamber 262c should be configured to ionize the gaseous mixture in such a way that ions of a gas constituent to be separated are predominately of a first polarity, and other species present in the mixture are predominately neutral (i.e., not ionized), or predominately ions of an opposite polarity. For example, for separation of air into oxygen and nitrogen, conditions within the ionization chamber 262c may be configured to produce negative ions predominately comprised of $O_2^-$, and positive ions predominately comprised of $N_2^+$.

In general, ionization of gas mixtures is a complex phenomena that has been thoroughly studied for different applications. The same apparatus may yield different results, depending on how process parameters such as gas pressure, electric field, and gas chemistry are controlled. It is not the object of the invention to define particular process parameters or particular apparatus for achieving a given result. It is noted, however, that for the separation of oxygen from air, $O_2^-$ ions may be produced by a "quiet and dark" ionization that occurs at relatively low ratios of electric field strength to gas pressure, such as known in the art of air ionization for air conditioning applications. At relatively high ratios of electric field strength to gas pressure, positive oxygen ions may be produced as well as other forms such as atomic oxygen or ozone, which may be undesirable.

Electrode banks 210, 212 may be configured in various ways. In an embodiment of the invention, each of their constituent electrodes 211a-c and 213a-c are conductive plates. For example, the electrodes may be aluminum or copper plates. In a prototype embodiment, the electrodes comprise thin circular aluminum plates perforated by equally-spaced holes. The electrode plates are oriented parallel to one another, and are mounted within enclosure 204 so as to divide the enclosure into a central enclosed volume (ionization chamber) 262c between the electrodes, and two exhaust plenums 224, 226, as shown in FIG. 2. Each electrode is gas-permeable to provide for fluid communication between the exhaust plenums 224, 226 and the ionization chamber 262c between the electrodes.

Electrode banks 210, 212 should be spaced apart far enough so that gas adjacent to one electrode bank, e.g., bank 210, is not likely to be suctioned into the exhaust plenum belonging to the opposite electrode, e.g., plenum 226 of electrode bank 212. At the same time, the electrode banks should not be spaced too far apart, as this will weaken the electric field and make separation of ions less likely. In other words, in selecting an appropriate spacing and configuration of the electrode, the fluid dynamics created by pump suction should be considered as well as the electric field between the electrodes. In a prototype embodiment, the electrode banks were spaced approximately 4 inches apart and were positioned symmetrically with respect to the center of the enclosure 204. Each electrode in the respective banks was positioned approximately 1.5 inches away from other electrodes in the same bank. A space of approximately 2 inches was provided between each electrode bank and its nearest exhaust port for each exhaust plenum 224, 226.

Pumps 228, 238 are connected to exhaust ports 218, 220, and may be operated to create suction in exhaust plenums 224, 226, respectively. Any suitable vacuum or suction pump may be used, depending on the intended mass flow rate through the system, the desired vacuum pressure in chamber 262c, and the electric field voltage. In a prototype embodiment, pumps 228, 238 comprised 145 mm 2-stage tangential bypass discharge vacuum pumps from Ametek® Lamb Electric of Kent, Ohio.

The flow of gas into and out of system 200 may be controlled by an intake valve (not shown), exhaust valve (not shown), and/or by varying the speed of pumps 228, 238. A gaseous mixture is drawn into the ionization chamber 262c as shown by arrow 236, because of suction provided by pumps 228 and 238. Gas within the chamber 262c is ionized by the electric field between electrode banks 210, 212, and ions of opposite polarity tend to propagate in opposite directions, towards an oppositely-charged one of the electrode banks. A portion of the gas passes through electrode bank 210, and is discharged through exhaust port 218, as indicated by arrow 230. The balance of gas flow passes through electrode bank 212 and is discharged through exhaust port 220, as indicated by arrow 240. Provided that chamber 102 is substantially sealed except for the gas ports, the inlet mass flow rate 236 will equal the sum of the exhaust flows 230, 240.

An electric field of static polarity is maintained between electrode banks 210, 212 by DC power source 242. Any suitable source of direct current (DC) power may be used, such as a discrete power supply. Power source 242 should be capable of maintaining the desired electrode voltage across the electrodes at a sustained power level. In a prototype embodiment, a DC-to-DC power converter, model SC-50 10 Watt, by American High Voltage of Elko, Nev., was used as a high voltage source 242. The power converter was designed to produce an output voltage of 0-5000 VDC, in proportion to an input voltage of 0-12 VDC. The power converter was powered by a AC-to-DC 9 V power supply 244, rated for 1200 mA maximum output. Power supply 244 was connected to ordinary 115 VAC household current 246. The output voltage of high voltage source 242 was nominally 5000 VDC prior to operation of the exhaust pumps. Although well below the voltage threshold for arc discharge, the voltage proved sufficient for attaining useful results in the separation of oxygen from air. Power dissipated by source 242 is believed to have been less than ten Watts.

For a given configuration of electrodes and voltage supplied to the electrodes, the voltage of the electric field may be related to the mass flow of gas through the ionization chamber. Using an apparatus of the type shown in FIG. 2 open to an ambient air environment, a voltage difference between the electrodes may decrease from an initial voltage measured when the ionization chamber is at atmospheric pressure. As gas is pumped out from the chamber, pressure in the chamber will be reduced if the entry port is sufficiently restricted. Surprisingly, the voltage difference between the electrodes will decrease as the exhaust pump speed is increased, until a certain vacuum level is obtained in the ionization chamber. That is, the maximum voltage drop is a function of the pump speed and input flow rate. If an input valve is in place on the entry port, as the valve is increasingly restricted, the maximum voltage drop will be observed at progressively slower pump speeds. The extent of voltage drop will depend on the characteristics of the voltage source, and is believed related to an electric current created by ionized gas flow between the electrodes. At pressures below the vacuum level at which a maximum voltage drop is observed, the voltage difference will again increase as the mass flow of gas between the electrodes decreases.

In a prototype system of the type shown in FIG. 2, the exhaust pumps described above were operated at their full design speed, drawing through a single entry port about 0.75 inches in diameter. In this mode, a pressure drop of about 5 inches Hg below atmospheric was measured by gauge 232. An oxygen sensor capable of reading percentage of oxygen in the range of 0-100% was positioned in the exhaust port of exhaust pump 228. The sensor was adjusted to read a concentration of 20% oxygen in ambient air, prior to placing in the exhaust port. Voltage drop at the voltage source 242 stabilized at about 400 V during operation of the pumps. Oxygen content stabilized at a level of about 26% total oxygen at the exhaust pump 240. Hence, the prototype successfully enriched the oxygen content of the exhaust by about 30%, relative to ambient levels. It is believed that greater oxygen enrichment is also possible, by implementing the features of the inventions disclosed herein.

Figure 3:
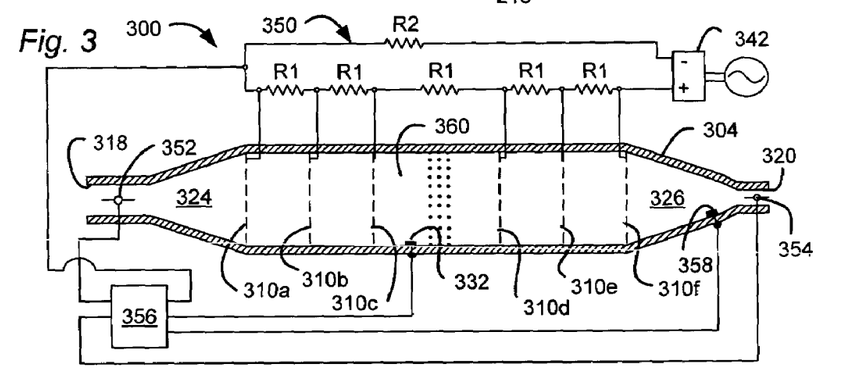
FIG. 3 is a diagram showing an exemplary multistage system for gas separation, according to an alternative embodiment of the invention.

FIG. 3 shows an alternative system 300 for gas separation. Like system 200, system 300 includes a generally tubular enclosure 304 housing a plurality of permeable electrodes 310a-f in a passageway 360, an entry port 316 and two exhaust ports 318, 320 disposed at opposite ends of the passageway. Electrodes 310a-f are disposed across passageway 360, dividing it into a plurality of sections each bounded on opposing ends by an electrode. Differences from system 200 include tapered exhaust ports 318, 320 to promote laminar flow, a voltage divider circuit 350, exhaust control valves 352, 354, and controller 356. It should be appreciated that system 300 exemplifies various new features and modifications to system 200, and it is not necessary that all of these new features be used together at once. A system according to the invention may be constructed by selecting from these new features and modifications as desired.

Each electrode 310a-f may be connected to a different node of voltage divider circuit 350. Resistors R1 may be of equal value, and divide the output of high voltage source 342 into equal (or if desired, unequal) increments. High voltage source 342 is any suitable source of high-voltage DC current. Resistor R2 should be of comparatively high impedance relative to the sum of the impedances of resistors R1, so that substantially all of the voltage output of source 342 is available between the resistors R1. R2 should also be resistive enough to prevent unnecessary dissipation of power by circuit 350. Thus, for example, if voltage source 342 provides an output voltage of 50,000 V, this may be divided equally by resistors R1 into increments of 10,000 V each. Electrode 310a, when connected to circuit 350 as shown, will be the most negatively charged of electrodes 310a-f. Electrode 310b will be 10,000 V more positive than electrode 310a, while being 10,000 V more negative than electrode 310c; and so on down the sequence of electrodes to the most positive electrode 310f. Any other suitable voltage divider circuit may be used; for example, multiple high-voltage sources may be connected in series, with their connection nodes and end nodes dividing the sum of their voltage output.

Thus, an electric field of approximately uniform magnitude may be generated along the length of passageway 360. This relatively long high-voltage electric field should enhance ionization in the gas mixture, as well as separation of ionized gases. In effect, the space between adjacent electrodes may be used as an extension of the ionization chamber 302. The electric field between individual electrodes may be made as strong as desired, up to the threshold imposed by arcing. The total voltage drop across the bank of electrodes 310a-f may therefore be greater than would be possible using just two oppositely-charged electrode banks of equivalent spacing. In addition, just as in system 200, the presence of additional electrodes in the gas flow path may enhance net diffusion of ionic species towards an oppositely charged electrode, and reduce backwards diffusion. A still further advantage is that the tubular enclosure 304 may readily be curved, coiled or contoured along its length to fit in a desired space, and the static electric field required for separation of ionic species may be maintained along a curved flow path by placing electrodes at sufficiently close intervals along the curve.

Systems 300 or 200 may be used without dedicated exhaust pumps in a system, such as an internal combustion engine, that generates an independent source of suction. Hence, referring again to FIG. 3, system 300 is depicted without exhaust pumps. It should be appreciated, however, that suction should be applied to both exhaust ports 318, 320, thereby drawing gas in through entry plenum 316, for system 300 to operate in a manner similar to that described for system 200. Lacking dedicated exhaust pumps, flow through system 300 may be controlled by valves 352, 354 connected in series with one or more of the exhaust ports. Exhaust port 318 may have a higher flow capacity than port 320, depending on the gas mixture to be separated and the intended purity of separation. For example, a ratio of 4:1 in the flow capacity of port 318 to 320 may be useful. The ratio may be less; but preferably should not be less than 1:1.

System 300 may be configured as a component for installation in a more complex assembly, such as an internal combustion engine. For such applications, it may be particularly useful to configure system 300 for electronic control, either by a controller in the more complex assembly, and/or by a dedicated controller 356. There are, of course, various ways that system 300 may be configured for automatic control. One approach may be to connect a controller 356, such as a programmable processor or controller, to sensors capable of measuring useful operating parameters. For example, controller 356 may be connected to an oxygen or other gas sensor 358 located in or near one of the exhaust plenums 326 or ports 354. In addition, or in the alternative, voltage drop of the divider circuit 350 may be measured.

Generally, given a unvarying voltage supply, a voltage drop will be proportional to degree of ionization and gas separation. Another input may be provided by connecting to a pressure sensor 332 inside enclosure 304, such as near or in the ionization chamber 302. Controller 356 may be connected to control one or more of the exhaust valves 352, 354, whereby flow through system 300 may be controlled independently from a more complex system to which it may belong. In the alternative, or in addition, controller 356 may communicate with other components of the more complex system, and thereby control flow through system 300.

Figure 4:
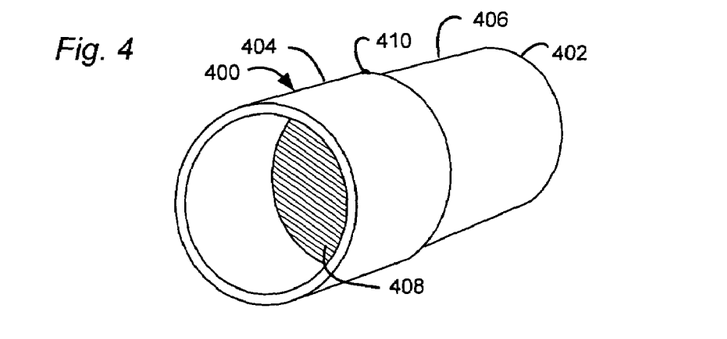
FIG. 4 is shows an exemplary module of a multistage system for gas separation.

It may be desirable to construct multiple-electrode gas separators, such as exemplified by systems 200 and 300, using modular single-electrode stages. Such modules may facilitate construction of a separator having any desired number of stages, and/or may make the gas separator easier and cheaper to construct. FIG. 4. shows an exemplary single-stage module 400 for use in such a modular assembly. Module 400 may comprise a plastic tubular fitting, such as a pipe fitting 402. Fitting 402 may comprise a collar 404 having an inner diameter sized to fit an outer diameter of tube section 406. Module 400 further comprises a gas-permeable electrode 408 disposed across the interior of fitting 402. Electrode 408 may be attached to the interior of the fitting using any suitable method, such as with an adhesive. An electrical terminal 410 may be disposed on the exterior of fitting 402. Terminal 410 is electrically connected to electrode 408, by which the electrode may be maintained at a desired voltage.

Figure 5:
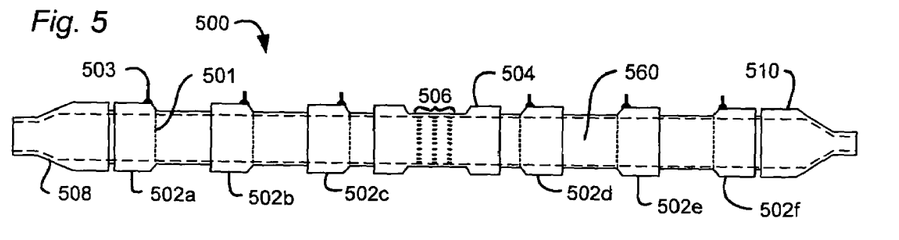
FIG. 5 shows an exemplary modular multistage system for gas separation.

FIG. 5 shows a modular tubular enclosure 500 and related components for a gas separation system, such as may be constructed using modules such as module 400, shown in FIG. 4. Enclosure 500 comprises six modules 502a-f like module 400. Each of modules 502a-f may be substantially identical. Each module includes a gas-permeable electrode with a connected terminal, for example, electrode 501 and connected terminal 503. Enclosure 500 further comprises a centrally-located entry port module 504. Module 504 may be provided with an array of small openings 506, to serve as an entry port conducive to maintaining laminar flow conditions. In the alternative, or in addition, module 504 may have one or more larger entry ports, each of which may be controlled by an adjustable valve (not shown). Enclosure 500 may further comprise exhaust port modules 508, 510 at opposite ends of enclosure 500, connected by passageway 560. Each exhaust port module 508, 510 may have a suitably sized exhaust port, which may be of different sizes from one another. All of the modules used for enclosure 500 may be made from inexpensive plastic molded parts, such as PVC pipe fittings, or other suitable materials. When assembled as shown in FIG. 5, enclosure 500 may be used to implement either of systems 200 and 300 shown in FIGS. 2 and 3, respectively.

Figure 6:
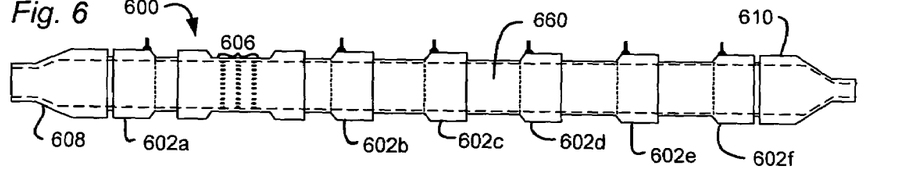
FIG. 6 shows an exemplary multistage system for gas separation, of a type utilizing asymmetric positioning of the entry port.

A modular enclosure may readily be constructed in different configurations. For example, FIGS. 2, 3, and 5 all show enclosures with centrally-placed entry ports. That is, all of the foregoing embodiments show an equal number of equally-spaced electrodes disposed between the entry port and each of the two exhaust ports. In an alternative embodiment, the entry port is not centrally located. FIG. 6 shows an enclosure 600 with an asymmetrically-placed entry port 606. Electrode module 602a is disposed to the left of entry module 604. Electrode modules 602b-f are disposed to the right of entry module 604. In this manner, gas flow through passageway 660 to one of the exhaust ports, for example, exhaust module 610, can be made to flow through a greater number of electrodes and/or a longer electric field than flow through the opposite exhaust module 608. This may cause different results from an enclosure with a symmetrically-placed entry port. For example, a higher concentration of a first gas species (e.g., oxygen) may be achieved at both exhaust ports 610 and 608 (with a corresponding decrease in mass flow rate out port 610 and increase in mass flow rate out port 608), relative to a system with a symmetrically-placed entry port.

FIG. 7 shows a system 700 for gas separation making use of multiple linked stages 710, 730, 750. Stages 710 and 730 each direct treated gas from one of their exhaust ports into an entry port for a subsequent stage. The final stage 750 exhausts "thrice-treated" gas, such as oxygen-enriched gas, for any desired use. The first stage 710 draws in the gas mixture (for example, air) to be separated through its entry port. A passageway 760 for gas flow extends through all three stages. Each stage may be constructed to resemble a version, such as a scaled-down version, of an earlier stage. Although drawn with modular components, these stages may be constructed in any suitable fashion, with or without modular components. Although three stages are shown, any system with two or more stages may be constructed and operated in similar fashion.

Stage 710 comprises an entry plenum 712 having a single opening 711 through which the initial gas mixture must pass, as shown by arrow 701. An adjustable valve (not shown) may be used to control the flow of gas into plenum 712. After passing through the opening, the gas mixture enters a plenum chamber 713, from whence it may bleed into the ionization chamber 716 by passing though a plurality of small openings 714. Thus, system 700 exemplifies a type of entry port capable of combining the advantages of plenum-type and valved entry ports. Any other suitable entry port may be used, including an entry plenum or a discrete port with or without an entry valve.

Stage 710 comprises two oppositely-charged electrodes 715, 717 disposed on opposite sides of the entry port, comprising an electrode-bounded section. Each of the other stages 730 and 750 similarly comprises a section, all of which are disposed in a serial fashion along pathway 760. In the alternative, oppositely charged electrode banks may be used as in system 200, or a plurality of cascaded electrodes as in system 300, or any other suitable electrode configuration may be used for any of stages 710, 730, and 750. For separation of oxygen from air, electrode 717 may be positively charged, and electrode 715 negatively charged, using any suitable high-voltage source. In this configuration, oxygen-enriched gas may be drawn into the second stage 730 as shown by arrow 702. Oxygen-depleted air may be drawn out an opposite exhaust port 718, as shown by arrow 705. The sum of the mass flow rates indicated by arrows 702 and 705 should equal the input flow rate indicated by arrow 701.

The mass flow rate into stage 730 is, accordingly, less than the input flow rate indicated by arrow 701. The volume of stage 730—i.e., it's cross-sectional flow area—may be reduced a corresponding amount to maintain a relatively uniform flow velocity through the system. In the alternative, stages of equal sizes may be used, in which case flow through the subsequent stages will be reduced in velocity. To enable the use of a common suction pump or other suction source at exhaust ports 718, 738, and 758, suitable exhaust plenums or valves (not shown) may be provided for flow control through these ports. Likewise, a suitable plenum and/or exhaust valve (not shown) may be provided for flow control through exhaust port 759, through which the most highly-enriched oxygenated air flows.

Flow 702 enters stage 730 into an ionization chamber disposed between oppositely charged electrodes 735, 737. These electrodes provide an electric field that is transverse to the flow 702 in passageway 760. Optionally, as shown in FIG. 7, the passageway may redirect the flow of gas between stages 710, 730, and/or 750. Electrodes 735, 737 may be connected in parallel to electrodes 715, 717 in stage 710 and to electrodes 755 and 757 in stage 750, respectively. Thus, a single high-voltage source may be used for system 700, with the full source potential available for each stage. An entry plenum or discrete port may be used to discharge gas into stage 730 between the electrodes 735, 737. If desired, a flow control valve (not shown) may be provided between stages 710 and 730, and/or between stages 730 and 750. Entry flow 702 into stage should equal the combined mass flow rate of the exhaust streams from stage 730, as indicated by arrows 703 and 706.

When configured as shown, gas that is further enriched in oxygen is attracted towards positive electrode 737, where it is drawn into a final stage 750 by suction applied to ports 758 and 759. Gas that is depleted in oxygen is drawn towards opposite electrode 735 and drawn out port 738. A control valve (not shown) may be positioned between stage 730 and 750, with or without a plenum entry port. Final stage 750 may be reduced in size from stage 730, commensurate with its reduced entry flow rate. Stage 750 may be configured similarly to stages 730 and 710, with oxygen-enriched gas drawn past electrode 757 and out port 759, while oxygen-depleted gas is drawn past negative electrode 755 and out port 758. Input gas flow 703 into stage 750 should equal the exhaust flows represented by arrows 704, 707. For optimal operation, all exhaust flows should be balanced to maintain an appropriate ratio between exhaust and purified gas at each stage, while also maintaining the ionization chamber of each stage at an optimal, less-than-atmospheric pressure.

Having thus described a preferred embodiment of a method and system for gas separation, it should be apparent to those skilled in the art that certain advantages of the within system have been achieved. It should also be appreciated that various modifications, adaptations, and alternative embodiments thereof may be made within the scope and spirit of the present invention. For example, an open system for separation of oxygen and nitrogen from air, and method for using the system, have been illustrated, but it should be apparent that the inventive concepts described above would be equally applicable to separation of other gaseous constituents from other mixtures. For further example, it should be apparent that a system according to the invention may be used in connection with various different applications, including but not limited to combustion processes such as internal combustion engines, air conditioning, industrial processes and fire suppression. The invention is further defined by the following claims.

What is claimed is:

1. A modular tubular system for separating a gaseous constituent from a gaseous mixture, comprising:
   a plurality of single-stage modules, each single-stage module comprising:
      a tube section connected to a collar section, wherein the collar section has an inner diameter sized to fit an outer diameter of the tube section, the tube section having a tubular interior;
      a gas-permeable electrode disposed across the tubular interior; and
      an electrical terminal connected to the gas-permeable electrode;
   an entry port module for receiving the gaseous mixture, wherein the entry port module comprises first and second openings for connecting to the tube section of the single-stage modules; and
   a substantially sealed passageway formed by connecting the plurality of single-stage modules and entry port module in serial fashion, the passageway extending between a first exhaust port module and a second exhaust port module.

2. The system of claim 1, further comprising a high-voltage source connected to the plurality of gas-permeable electrodes through the electrical terminals so as to provide a static high-voltage electric field.

3. The system of claim 1, further comprising a voltage divider circuit connected to the gas-permeable electrodes through the electrical terminals, whereby a high-voltage source can be divided among the gas-permeable electrodes in increments, between a highest voltage at a first one of said gas-permeable electrodes nearest the first exhaust port module, and a lowest voltage at a last one of said gas-permeable electrodes nearest the second exhaust port module.

4. The system of claim 1, wherein the plurality of single-stage modules includes at least three single-stage modules.

5. The system of claim 1, wherein the entry port module is positioned midway between the first exhaust port module and the second exhaust port module.

6. The system of claim 1, wherein the entry port module is positioned closer to the first exhaust port module than to the second exhaust port module.

7. The system of claim 1, wherein the entry port module further comprises a plurality of small openings into the passageway.

8. The system of claim 1, further comprising a plenum chamber enclosing the plurality of small openings, the plenum chamber having a single opening to admit flow of entry gas.

9. The system of claim 8, further comprising an adjustable control valve connected in series with the single opening to the plenum chamber.

10. The system of claim 1, further comprising an adjustable control valve connected in series with the entry port module.

11. The system of claim 1, further comprising an adjustable control valve connected in series with at least one of the first and second exhaust port modules.

12. The system of claim 1, wherein the first exhaust port module and the second exhaust port module are not equal in size.

13. The system of claim 1, wherein the passageway is of constant cross-section.

14. The system of claim 1, wherein the plurality of single-stage modules, the entry port modules, and the exhaust port modules are compared of molded plastic.

* * * * *